US009546563B2

(12) United States Patent
Panambur et al.

(10) Patent No.: US 9,546,563 B2
(45) Date of Patent: Jan. 17, 2017

(54) AXIAL TURBINE WITH CONTAINMENT SHROUD

(75) Inventors: Suresha Kumar Panambur, Bangalore (IN); Nagamohan Govinahalli Prabhakar, Bangalore (IN); Subramanya Shankar, Bangalore (IN); Daniel Loringer, Erie, PA (US); Lukas Johnson, Erie, PA (US); Andrew Theogift Jeyanth Selwyn Victor, Bangalore (IN)

(73) Assignee: General Electric Company, Schenectady, NY (US)

( * ) Notice: Subject to any disclaimer, the term of this patent is extended or adjusted under 35 U.S.C. 154(b) by 1101 days.

(21) Appl. No.: 13/440,676

(22) Filed: Apr. 5, 2012

(65) Prior Publication Data

US 2013/0266428 A1 Oct. 10, 2013

(51) Int. Cl.
*F01D 21/04* (2006.01)
*F01D 11/14* (2006.01)
*F01D 25/24* (2006.01)
*F02C 6/12* (2006.01)

(52) U.S. Cl.
CPC ............. *F01D 11/14* (2013.01); *F01D 21/04* (2013.01); *F01D 21/045* (2013.01); *F01D 25/24* (2013.01); *F02C 6/12* (2013.01); *Y10T 29/49245* (2015.01)

(58) Field of Classification Search
CPC ......... F01D 11/006; F01D 11/08; F01D 11/14; F01D 21/04; F01D 21/045; F01D 25/24
USPC ........................................................... 415/9
See application file for complete search history.

(56) References Cited

U.S. PATENT DOCUMENTS

| 3,097,824 | A | * | 7/1963 | Alexanderson et al. | ......... 415/9 |
|---|---|---|---|---|---|
| 3,762,833 | A | * | 10/1973 | Miller et al. | ................... 415/136 |
| 5,188,505 | A | | 2/1993 | Schilling et al. | |
| 5,328,324 | A | | 7/1994 | Dodd | |
| 5,447,411 | A | | 9/1995 | Curley et al. | |
| 5,513,949 | A | | 5/1996 | Armstrong | |
| 5,823,739 | A | * | 10/1998 | Van Duyn | ......................... 415/9 |
| 5,934,868 | A | | 8/1999 | Battig et al. | |

(Continued)

FOREIGN PATENT DOCUMENTS

| CN | 101595286 A | 12/2009 |
|---|---|---|
| EP | 0965731 A2 | 5/1999 |

(Continued)

OTHER PUBLICATIONS

Search Report and Written Opinion from corresponding PCT Application No. PCT/US2013/030651 dated Jun. 18, 2013.
Unofficial English Translation of Chinese Office Action issued in connection with corresponding CN Application No. 201380018842.3 on Jun. 1, 2015.

*Primary Examiner* — Eric Keasel
*Assistant Examiner* — Danielle M Christensen
(74) *Attorney, Agent, or Firm* — John A. Kramer; Global Patent Operation

(57) ABSTRACT

Various methods and systems are provided for an axial turbine including a containment shroud. In one example, an axial turbine for use in an engine system comprises a turbine disc/blisk and a shroud housing the turbine disc/blisk, the shroud including a first region, a second region, and a third region. A thickness of the second region is dependent on a length between the first region and the third region, and the third region has a burst strength that under a burst condition retains one or more fragments of the turbine disc/blisk.

6 Claims, 8 Drawing Sheets

(56) References Cited

U.S. PATENT DOCUMENTS

| | | | |
|---|---|---|---|
| 6,059,523 A | 5/2000 | Modafferi et al. | |
| 6,206,631 B1 | 3/2001 | Schilling | |
| 6,305,899 B1 | 10/2001 | Saunders | |
| 6,575,694 B1 | 6/2003 | Thompson et al. | |
| 7,344,362 B2 | 3/2008 | Kopp et al. | |
| 2004/0146393 A1 | 7/2004 | Evans et al. | |
| 2007/0253804 A1 | 11/2007 | Heyerman | |
| 2010/0115944 A1 | 5/2010 | Shutty et al. | |
| 2010/0143104 A1* | 6/2010 | Furman et al. | 415/173.7 |
| 2012/0027569 A1* | 2/2012 | Purdey | F01D 11/00 415/1 |
| 2012/0039703 A1* | 2/2012 | Swenson | F01D 21/045 415/9 |
| 2012/0114475 A1* | 5/2012 | Norem | 415/208.1 |

FOREIGN PATENT DOCUMENTS

| | | | |
|---|---|---|---|
| EP | 0987403 | A2 | 9/1999 |
| EP | 0952310 | A2 | 10/1999 |
| EP | 1104837 | A2 | 6/2001 |
| EP | 1336739 | A2 | 8/2003 |
| EP | 1719879 | A1 | 11/2006 |
| EP | 1726788 | A2 | 11/2006 |
| EP | 1783343 | A2 | 5/2007 |
| JP | 0953462 | A | 2/1997 |
| WO | 9207180 | A1 | 4/1992 |
| WO | 9619640 | A1 | 6/1996 |

* cited by examiner

AXIAL TURBINE WITH CONTAINMENT SHROUD

FIELD

Embodiments of the subject matter disclosed herein relate to turbochargers. Other embodiments relate to a shroud for a turbine.

BACKGROUND

Turbochargers may be used in an engine system to increase a pressure of air supplied to the engine for combustion. In one example, the turbocharger includes a turbine coupled in an exhaust passage of the engine which at least partially drives a compressor via a shaft to increase the intake air pressure. Exhaust gas passing through the turbine rotates the blades of a turbine disc, which is coupled to the shaft. The performance of the turbine disc assembly (bladed disc assembly) or turbine blisk (integral bladed disc) may be achieved by controlling the blade tip clearance between the blades/buckets and a turbine shroud. Depending on operating conditions, the turbine disc may rotate at speeds exceeding 25,000 RPMs. In the event of degradation of the turbine resulting in release of part or the entire turbine disc, catastrophic damage to the turbine, as well as other system components in the vicinity of the turbine, may occur if the released turbine disc fragments are not contained.

To contain a released turbine disc, the turbine shroud, typically designed to provide turbine performance, may be designed to absorb the impact of any released disc fragments. However, material and packaging constraints may result in regions of the shroud that are unable to withstand the impact of a high-energy fragment release, particularly when the shroud is subject to the high temperatures present in the exhaust of an engine.

BRIEF DESCRIPTION

In one embodiment, an axial turbine for use in an engine system comprises a turbine disc/blisk and a shroud housing the turbine disc/blisk, the shroud including a first region, a second region, and a third region. A thickness of the second region is dependent on a length between the first region and the third region, and the third region has a burst strength that under a burst condition retains one or more fragments of the turbine disc/blisk.

In this way, the shroud may have burst strength in the region proximal to the turbine disc that is optimized to contain a high-energy fragment release that may occur during a burst condition. The burst strength may be a function of a thickness of the third region. Further, in some embodiments, the shroud may be comprised of a material with a relatively high modulus of toughness at high temperatures. By increasing the toughness and thickness of the region of the shroud proximal to the turbine disc, release of high energy fragments from the shroud may be avoided.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of a shroud for a turbine. The shroud may be coupled to a casing of the turbine and extend out circumferentially to surround a turbine disc of the turbine. Depending on the constraints of the turbine in which it is positioned, the shroud may have a containment region of increased burst strength proximal to (e.g., just radially outwards from) the turbine disc. The thickness of this region may be optimized or otherwise configured to provide a burst strength that can contain a high-energy fragment release. Further, the shroud may be comprised of a material having a higher strength at elevated temperatures than previous shroud materials. The shroud may also be optimized or otherwise configured with regard to the thickness of a transition region adjacent to the containment region, to withstand the load placed on the shroud and improve the structural integrity of the shroud.

In one embodiment, the shroud may be housed in a turbocharger, which may be coupled to an engine in a vehicle. A locomotive system is used to exemplify one of the types of vehicles having engines to which a turbocharger, or multi-turbocharger, may be attached. Other types of vehicles may include other types of rail vehicles, on-highway vehicles, off-highway vehicles other than rail vehicles, mining equipment, and marine vessels. Other embodiments of the invention may be used for turbochargers that are coupled to stationary engines. The engine may be a diesel engine, or may combust another fuel or combination of fuels. Such alternative fuels may include gasoline, kerosene, biodiesel, natural gas, and ethanol. Suitable engines may use compression ignition and/or spark ignition.

Figure 1:
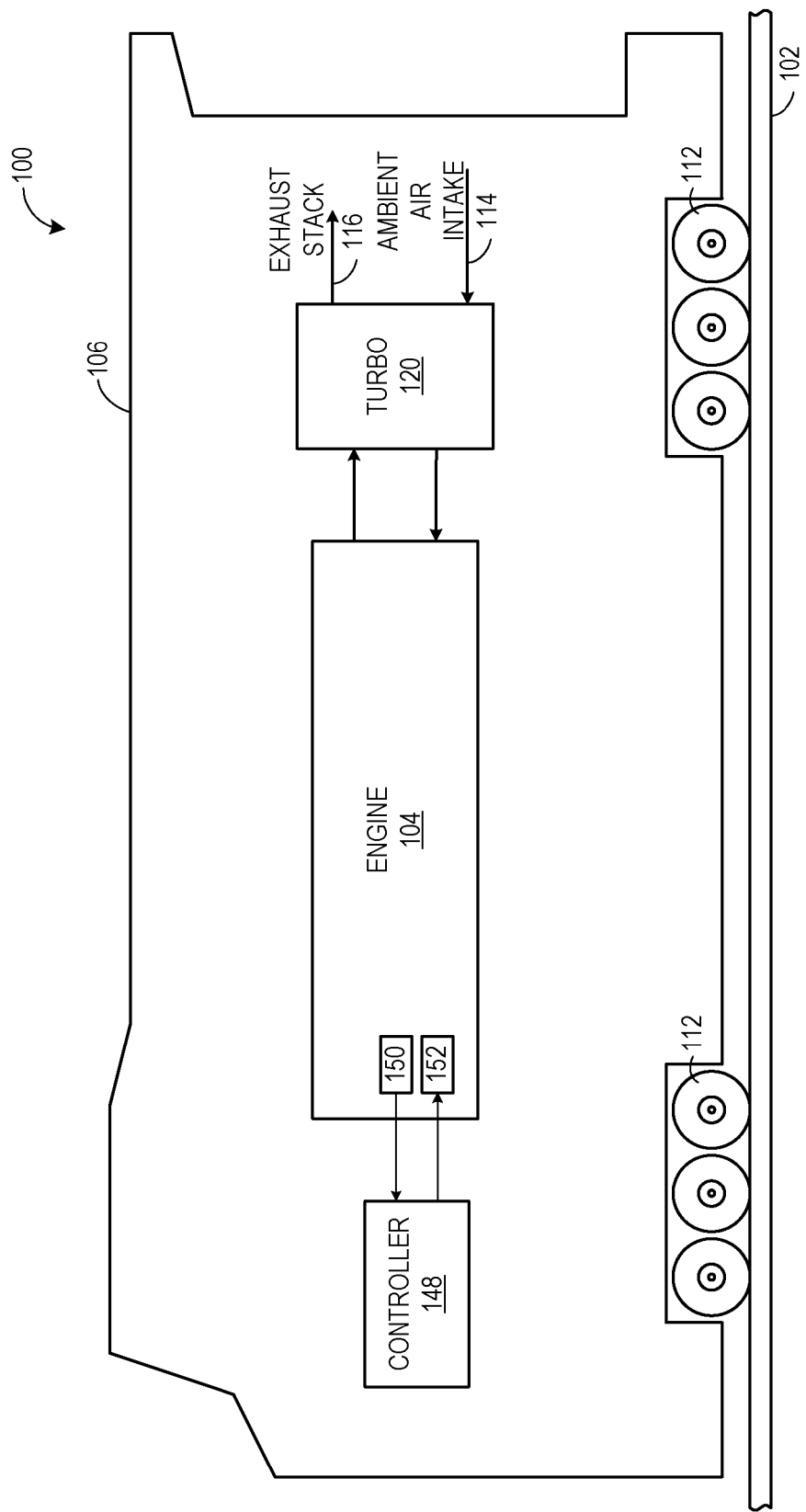
FIG. 1 shows a schematic diagram of an example embodiment of a vehicle with a turbocharger according to an embodiment of the invention.

FIG. 1 shows a block diagram of an exemplary embodiment of a vehicle system 100 (e.g., a locomotive system), herein depicted as a rail vehicle 106, configured to run on a rail 102 via a plurality of wheels 112. As depicted, the rail vehicle 106 includes an engine system with an engine 104.

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106.

The engine system includes a turbocharger 120 ("TURBO") that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown in FIG. 1) which is at least partially driven by a turbine (not shown in FIG. 1). While in this case a single turbocharger is shown, the system may include multiple turbine and/or compressor stages. The turbocharger is described in greater detail below with reference to FIG. 2.

In some embodiments, the vehicle system 100 may further include an exhaust gas treatment system coupled in the exhaust passage upstream or downstream of the turbocharger 120. In one example embodiment, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, $NO_x$ trap, or various other devices or systems.

The rail vehicle 106 further includes a controller 148 to control various components related to the vehicle system 100. In one example, the controller 148 includes a computer control system. The controller 148 further includes computer readable storage media (not shown) including code for enabling on-board monitoring and control of rail vehicle operation. The controller 148, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, boost pressure, exhaust pressure, ambient pressure, exhaust temperature, etc. Correspondingly, the controller 148 may control the vehicle system 100 by sending commands to various components such as fraction motors, alternator, cylinder valves, throttle, etc.

In one embodiment, the controller may include a communication system for reporting one or both of a flow measurement device output or a determined degradation of the turbocharger based on a measurement of pressure or flow generated by the flow measurement device, as will be described in greater detail below.

Figure 2:
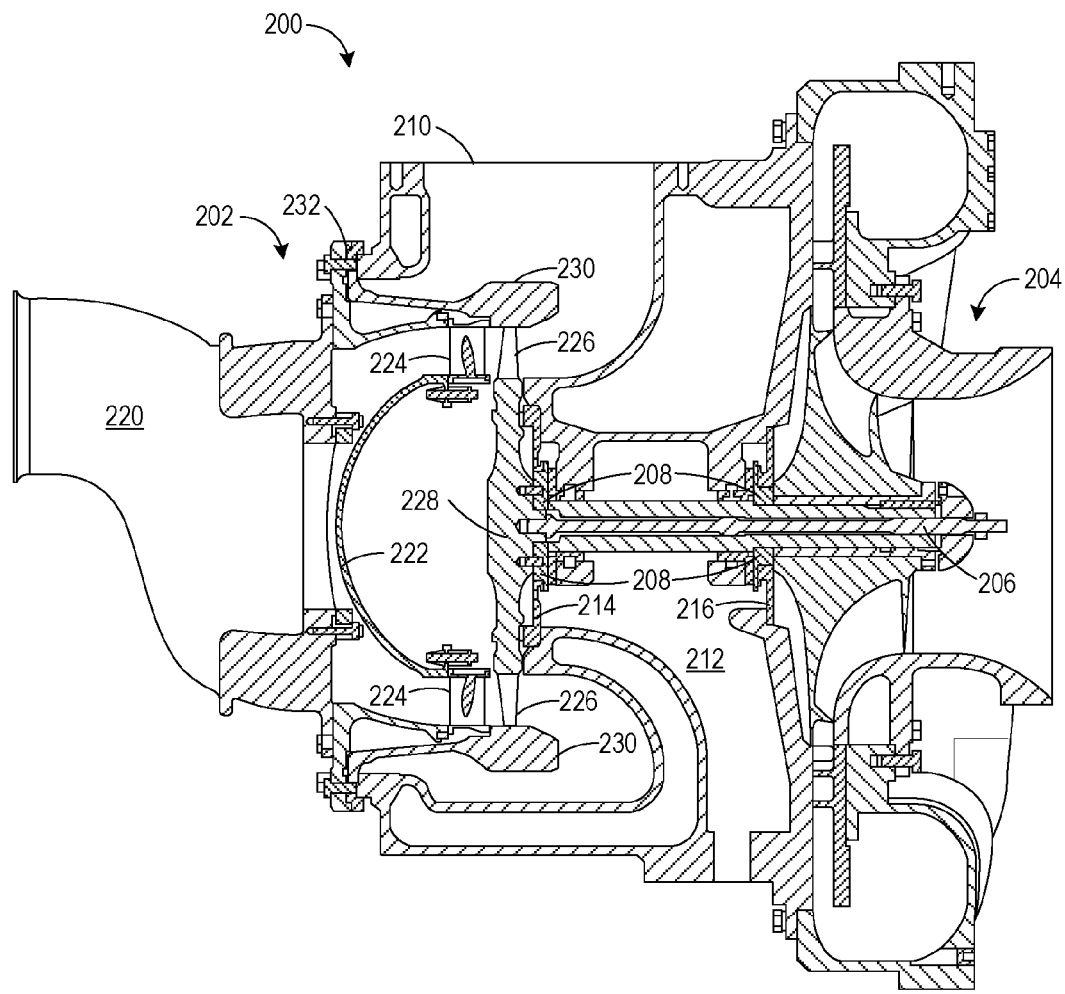
FIG. 2 shows a cross-sectional view of a turbocharger according to an embodiment of the invention.

FIG. 2 shows a cross-section of an exemplary embodiment of a turbocharger 200 that may be coupled to an engine, such as turbocharger 120 described above with reference to FIG. 1. In one example, the turbocharger may be bolted to the engine. In another example, the turbocharger 200 may be coupled between the exhaust passage and the intake passage of the engine. In other examples, the turbocharger may be coupled to the engine by any other suitable manner.

The turbocharger 200 includes a turbine stage 202 and a compressor 204. Exhaust gases from the engine pass through the turbine stage 202, and energy from the exhaust gases is converted into rotational kinetic energy to rotate a shaft 206 which, in turn, drives the compressor 204. Ambient intake air is compressed (e.g., pressure of the air is increased) as it is drawn through the rotating compressor 204 such that a greater mass of air may be delivered to the cylinders of the engine.

The turbocharger includes a casing 210. In some embodiments, the turbine stage 202 and the compressor 204 may have separate casings which are bolted together, for example, such that a single unit (e.g., turbocharger 200) is formed. As an example, the turbocharger may have a casing made of cast iron and the compressor may have a casing made of an aluminum alloy.

The turbocharger 200 further includes bearings 208 to support the shaft 206, such that the shaft may rotate at a high speed with reduced friction. As depicted in FIG. 2, the turbocharger 200 further includes two non-contact seals (e.g., labyrinth seals), a turbine labyrinth seal 214 positioned between an oil cavity 212 and the turbine 202 and a compressor labyrinth seal 216 positioned between the oil cavity 212 and the compressor 204.

Exhaust gas may enter through an inlet, such as gas inlet transition region 220, and pass over a nose piece 222. A nozzle ring 224 may include airfoil-shaped vanes arranged circumferentially to form a complete 360° assembly. The nozzle ring 224 may act to optimally direct the exhaust gas to a turbine disc/blade assembly, including blades 226 and a turbine disc 228, coupled to the shaft 206. In some embodiments, the turbine disc and blades may be an integral component, known as a turbine blisk.

The blades 226 may be airfoil-shaped blades extending outwardly from the turbine disc 228, which rotates about the centerline axis of the engine. An annular shroud 230 is coupled to the casing at a shroud mounting flange 232 and arranged so as to closely surround the blades 226 and thereby define the flowpath boundary for the exhaust stream flowing through the turbine stage 202.

The turbine stage 202 is an axial turbine, as the exhaust flow impels on the turbine blades in an axial direction relative to the center axis of the engine. However, in some embodiments, turbine stage 202 may be a radial turbine. Further, turbocharger 200 is depicted as a single-staged turbocharger, that is, only one turbine and one compressor are present. Multi-staged turbochargers, which include more than one turbine and more than one compressor, are also within the scope of this disclosure.

Figure 3:
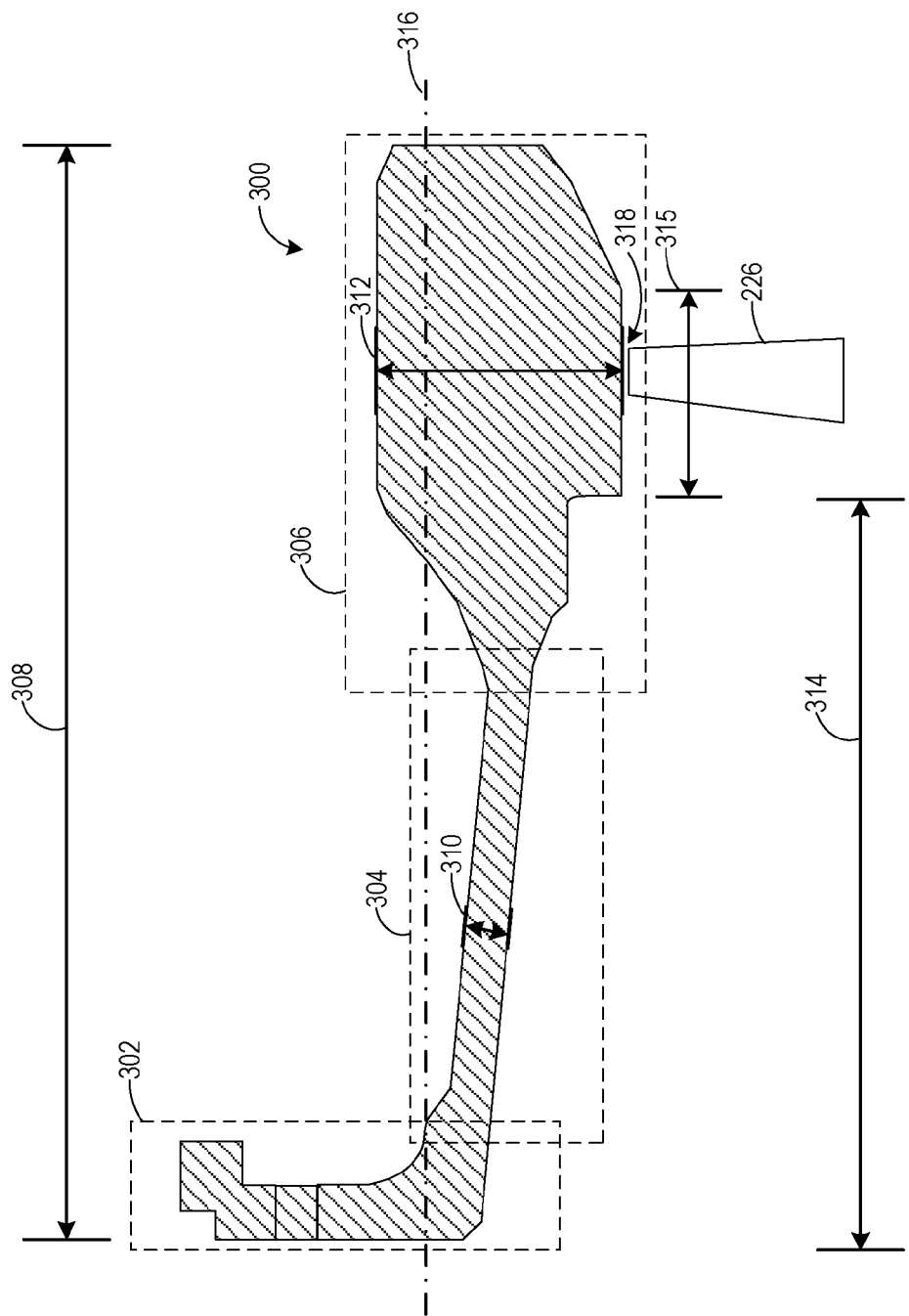
FIG. 3 shows a cross-section view of a first turbine shroud according to an embodiment of the invention.
Figure 4:
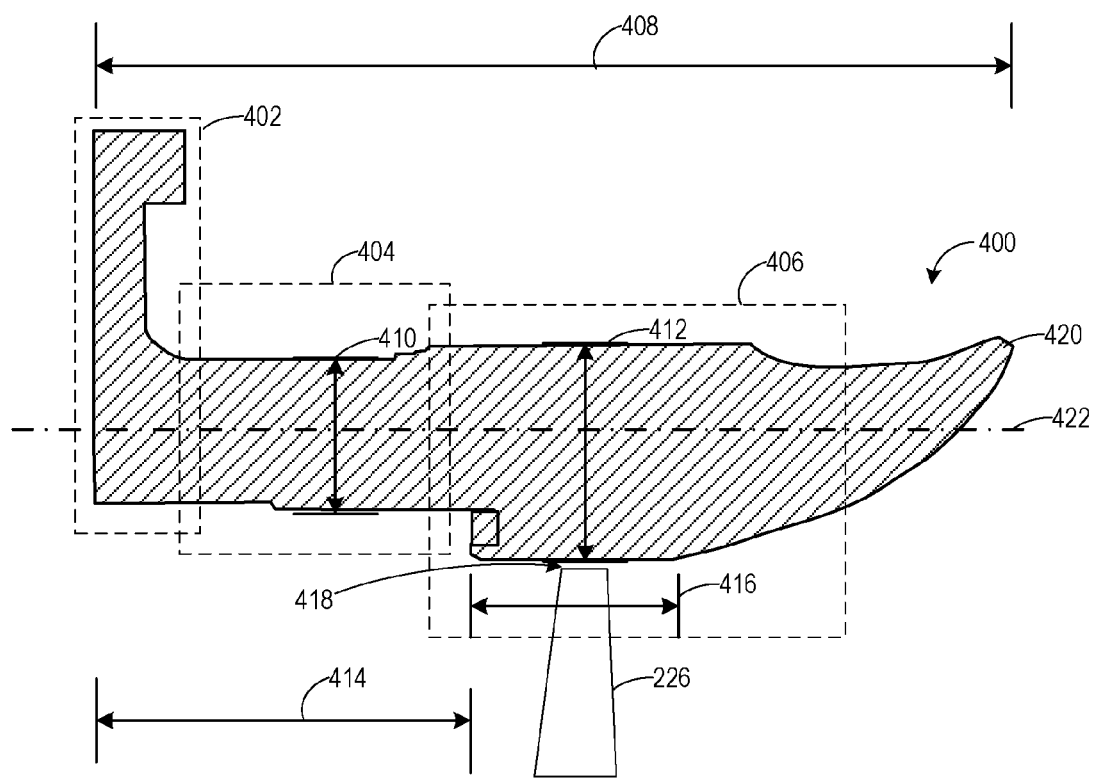
FIG. 4 shows a cross-section view of a second turbine shroud according to an embodiment of the invention.
Figure 5:
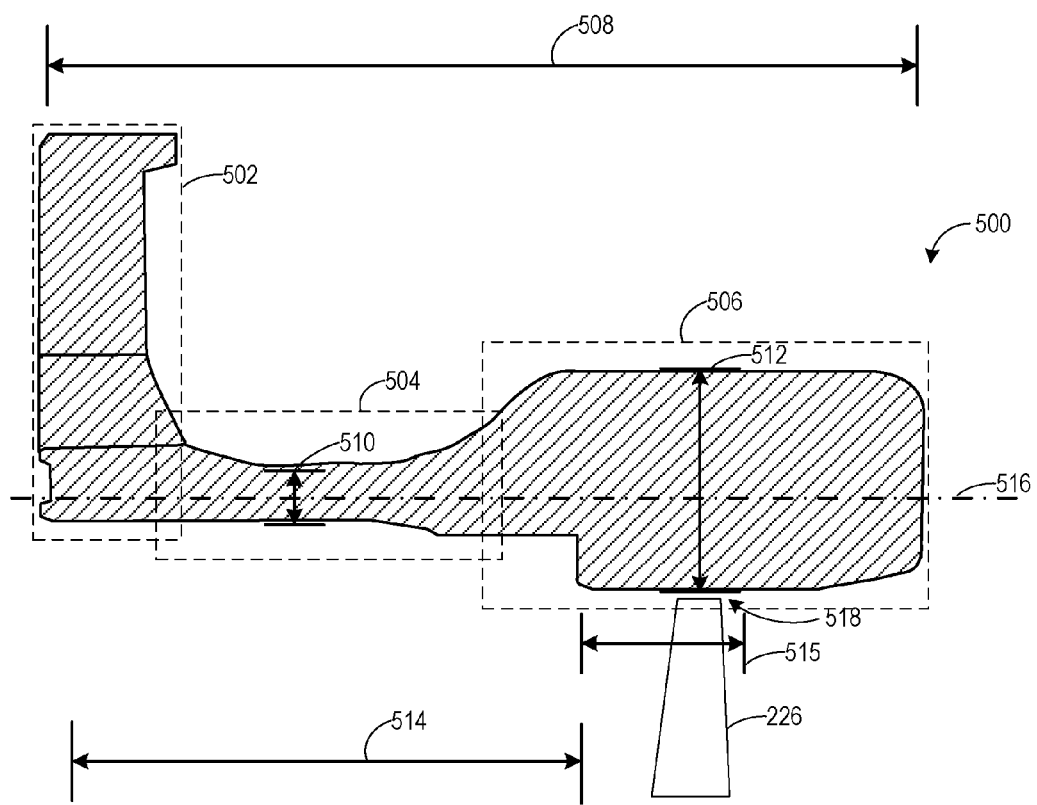
FIG. 5 shows a cross-section view of a third turbine shroud according to an embodiment of the invention.

FIGS. 3-5 depict various embodiments of a shroud housed in a turbine (e.g., one or more of the embodiments may be used for the annular shroud 230 shown in FIG. 2), such as the turbine stage 202 of FIG. 2. Each of the shrouds illustrated in FIGS. 3-5 has a burst strength that is optimized or otherwise configured to withstand an impact of a high-energy fragment, such as a fragment of a turbine disc, blade, or blisk that may be released during a burst condition of the turbine. Burst conditions may occur if there is a malfunction of the turbine structure, or due to the introduction of a foreign object into the turbine. In some burst conditions, one fragment of the turbine disc/blisk may originally be released, and the release of the first fragment may cause additional fragments of the disc/blisk to be released. In some embodiments, the entire disc/blisk may be released during a burst condition. (Thus, "burst condition" refers to a state where a turbine is operating, e.g., at maximum RPM or otherwise, and all or part of the disc/blisk is subject to an unintended release so as to come into contact with the shroud.) Specifically, each shroud may have increased burst strength that is a function of a zone of increased thickness of the shroud surrounding the turbine disc/blisk (i.e., the burst strength of the shroud surrounding the turbine disc/blisk is increased due to its greater thickness relative to a thinner material), and/or as a function of a modulus of toughness (which may be a function of ultimate tensile strength, yield strength, and/or percentage elongation to failure or failure strain) of the material comprising the shroud (i.e., the burst strength of the shroud surrounding the turbine disc/blisk is increased/higher due to the material of the shroud in this area having a modulus of toughness that is greater relative to a different material with a lower modulus of toughness). The increased burst strength of the shroud may retain the one or more turbine disc/blisk fragments within the shroud, preventing their release to other components of the turbocharger and/or engine.

Each shroud also is optimized or otherwise configured to conform to the constraints of the turbine in which it is housed. For example, a shroud may be housed in a low pressure turbine or a high pressure turbine, or in a single or multiple staged turbocharger, or other suitable turbocharger.

Additionally, the shroud may aid in turbine performance by providing a turbine disc/blisk bucket clearance region (e.g., 318, 418, 518) to direct flow of exhaust in the turbine. For example, the shroud may be configured such that a clearance space is established between the shroud and the turbine disc/blisk. This clearance space defines the flow path boundary for the exhaust stream flowing through the turbine stage, and as such the bucket clearance region size may be set to provide desired turbine disc/blisk performance, such as maximum turbine RPM, pressure drop, etc. Thus, the turbine shroud may provide both improved turbine performance and absorption of the impact of any released disc fragments.

While referring to the shroud embodiments depicted in FIGS. 3-5, as well as other description of the shroud of the present disclosure, the term "turbine disc" is used to denote either a bladed turbine disc assembly or an integral turbine blisk without departing from the scope of the disclosure. Further, the term "turbine disc/blisk" may indicate either one of a turbine disc and blades or an integral turbine blisk. Thus, "turbine disc/blisk" as used herein, refers to a turbine disc, a turbine blisk, or some other apparatus whose function is to move a turbocharger shaft with an exhaust stream.

FIG. 3 shows the upper-half of a cross-sectional view of a shroud 300 according to an embodiment of the present disclosure. (It should be appreciated that the views of FIGS. 3-5 are radial cross-sections, where a section has been taken along a plane coincident (axis lying within the plane) with a longitudinal axis of the annular shroud.) Shroud 300 may be housed in a turbine, such as turbine 202 of FIG. 2; shroud 300 is one non-limiting example of shroud 230 of FIG. 2. Shroud 300 may be housed in a single-staged turbocharger in one non-limiting example. Alternatively, shroud 300 may be housed in another suitable turbocharger.

Shroud 300 includes a first region 302, a second region 304, and a third region 306. The first region 302, second region 304, and third region 306 may be defined by function and/or proximity to a turbine disc housed within the shroud 300. The first region 302 may be a mounting region configured to couple the shroud 300 to a casing of the turbine, and is positioned distal from the turbine disc (a blade 226 of the turbine disc is illustrated in FIG. 3). In embodiments, a long axis of the first region 302 (parallel to line 312 shown in FIG. 3) is generally perpendicular to the longitudinal axis of the shroud 300 (parallel to line 314 or 316 in FIG. 3), thereby providing an annular flange for mounting the shroud. The first region 302 may define one or more mounting holes for passage of bolts or other fasteners to mount the shroud to a support. The first region 302 may extend into the second region 304. That is, in some embodiments the first region and second region may overlap. However, in other embodiments, the first and second regions may not overlap but the first region may end where the second region begins. The second region 304 may be a transition region arranged between the first region 302 and the third region 306. The second region 304 may extend into the third region 306, or may not extend into the third region. The third region 306 may be a containment region configured to surround a turbine disc. The third region 306 is proximal to the blade 226 of the turbine disc. Thus, the third region 306 may be positioned radially outwards from the turbine disc such that debris flying radially outwards from the turbine will hit the shroud.

The first region 302, second region 304, and third region 306 may be comprised of an integral piece of material. Alternatively or additionally, the shroud 300 may be a single-layered shroud. By utilizing a single, integral piece of material for the shroud, structural weak points, such as where multiple pieces of material join together, may be reduced. However, the shroud 300 may also be comprised of more than one piece of material, or may be a multiple-layered shroud, or may be another suitable arrangement. According to one aspect of the present disclosure, a single-layer shroud may refer to the shroud comprising only a single, integral layer of material, in a radial direction from the blade 226, that contributes substantially to containment during a burst condition. (In an embodiment, substantially means 0.5% or more; in another embodiment, substantially means 1% or more; in another embodiment, substantially means 5% or more.) Thus, for example, a single, integral layer of material in the radial direction could be coated with paint and/or an anti-rust coating, and still be considered a single-layer shroud if the paint and/or anti-rust coating would not substantially contribute to containment.

The shroud 300 has a total length 308 extending from the beginning of the first region to the end of the third region. The total length 308 of the shroud 300 is based on the distance from the shroud mounting flange of the turbine to the turbine blade of the turbine, so that the shroud may extend substantially around the nose piece, nozzle ring, and turbine disc of the turbine. In the depicted embodiment, shroud 300 may have a total length 308 in the range of 20-23 cm. For example, the shroud may have a total length of 21.4 cm. However, a total length in the range of 12-25 cm or other suitable lengths are also within the scope of this disclosure.

The shroud may vary in its thickness to optimize (or otherwise improve upon, versus shrouds that do not vary in thickness) containment capability or burst containment strength while maintaining performance within the constraints of the turbine. Thus, for example, as described in more detail below, the second region 304 may have a minimum thickness, generally in a radial direction (see 310 in FIG. 3), that is less thick than a thickness of the third region 306 that is radially outwards from the blade 226 (see 312). In other words, the radially narrowest part of the second region may be thinner than the thickness of the third region outwards from the blade 226.

The second region has a thickness 310, which is optimized (or otherwise configured) to bear the load placed on the shroud, e.g., by the third region. In one example, the thickness may range from 0.8-1.2 cm. Other thickness ranges are also possible, such as 0.1-2.5 cm or another suitable range.

The third region 306 may have a vertical, or containment, thickness 312 (i.e., thickness extending radially outwards from the longitudinal axis of the shroud and blades 226) configured to contain the release of turbine disc fragments during a burst condition. The thickness 312 may be optimized (or otherwise configured) to withstand the impact of a high-energy turbine disc fragment release, to prevent the fragment from exiting the vicinity of the shroud. The containment thickness 312 may be in the range of 3.5-5 cm, or another suitable range. In another example, the containment thickness may in the range of 4.3-4.8 cm. The containment thickness 312 may be included in a containment zone 315 of the third region 306 which is arranged directly around the turbine blades 226; the containment zone may extend axially a distance past the blades 226 on either side of the blades. The containment zone 315 may have a horizontal (axial) length of 3.8 cm, in the range of 2.5-5 cm, or another suitable length. In one example, the containment zone may have a length of 4.3 cm.

The thickness 310 of the second region may be selected dependent on a length 314 between the first region 302 and the third region 306. For example, as the length 314 between the first region 302 and the third region increases 306, the selected thickness 310 of the second region may decrease. In one exemplary embodiment, the length 314 between the first region and the third region may include the length between the beginning of the first region and the beginning of the containment thickness zone of the third region, and may be in the range of 12.5-15.5 cm. For example, the length 314 may be 15.1 cm. In another example, the length may be in the range of 10-25 cm. Other lengths are also within the scope of this disclosure. In the depicted embodiment, the length 314 between the first region and the third region is greater than half of a total length 308 of the shroud 300. The containment thickness 312 of the third region is greater than the thickness 310 of the second region. In the depicted embodiment, the containment thickness 312 of the third region is at least twice as thick as the thickness 310 of the second region.

Additionally, the second region 304 may be positioned at an incline with regard to a horizontal axis 316 of the shroud. The second region 304 may be positioned at an angle within the range of 0-30° with regard to the horizontal axis 316 of the shroud; that is, a long axis of the second region (transverse to the thickness 310, which is generally radially oriented) may be at the angle within the range of 0-30° with regard to the horizontal axis 316. In one embodiment, the second region 304 may be positioned at a 10° angle. In other embodiments, it may be positioned at a 20° angle, or may be positioned at another suitable angle with regard to the horizontal axis. The inclined position of the second region 304, together with the length 314 and thickness 310, may provide the second region 304 with increased flexibility to withstand the impact load placed on the shroud during a burst condition.

A clearance region 318 may be provided between the shroud 300 and the blades 226. This clearance region 318 improves performance by directing the exhaust in an optimal flow path. The clearance region 318 may be a spacing between the shroud 300 and blades 226 of a suitable length, such as a length (of the spacing between the shroud and blades) in the range of 0.03-0.25 cm. In one non-limiting example, the clearance region 318 may have a length of 0.09 cm.

The capability of the shroud 300 to contain a high-energy fragment may be a function of the vertical thickness of the containment zone (e.g., the containment thickness 312) and/or a modulus of toughness of the material from which the shroud is constructed. The modulus of toughness (MOT) may be a function of the yield strength, tensile strength, and/or percentage failure strain of the material. The MOT of the material in the shroud may be greater than a threshold MOT at elevated temperatures, compared to other materials typically used in shrouds. The threshold MOT may be in the range of 10,000-20,000 psi or another suitable threshold at relatively high temperatures, such as temperatures between 500° and 700° C. In one non-limiting example, the threshold may be 14,000 psi at a temperature of 500° C. As the shroud may be exposed to high temperatures, the high toughness and tensile strength may provide increased ability to withstand the impact of a high-energy fragment during burst conditions at high temperature.

The shroud 300 may be comprised of wrought stainless steel having increased strength and/or toughness at high temperatures, relative to shrouds made of different materials. In one example, the shroud may be comprised of NITRONIC 50® stainless steel (wrought equivalent of CG6MMN cast stainless steel). However, other materials which provide suitable strength at high temperatures may also be used. Table 1 shows the MOT of NITRONIC 50® compared to that of ductile iron, which is frequently used in the construction of turbine shrouds. As shown, the NITRONIC 50® has a higher MOT than the ductile iron, at both lower and higher temperatures.

TABLE 1

| Temperature (° C.) | MOT (psi) of ductile iron | MOT (psi) of NITRONIC 50 ® |
| --- | --- | --- |
| 20 | 11270 | 32428 |
| 537 | 10180 | 20591 |
| 649 | 12732 | 17486 |

FIG. 4 shows the upper-half of a radial cross-sectional view of an annular shroud 400 according to another embodiment of the present disclosure. Shroud 400 may be housed in a turbine, such as turbine 202 of FIG. 2; shroud 400 is one non-limiting example of shroud 230 of FIG. 2. Shroud 400 may be housed in a single-staged turbocharger in one non-limiting example, or in the first stage of a multi-staged turbocharger, or in another suitable turbocharger. Similar to shroud 300 described above with respect to FIG. 3, shroud 400 includes a first region 402, a second region 404, and a third region 406. Also similar to shroud 300, the first region 402 may be a mounting region configured to couple the shroud 400 to a casing of the turbine, and is positioned distal from the turbine disc (a blade 226 of the turbine disc is illustrated in FIG. 4). A long axis of the first region 402 is generally perpendicular to the longitudinal axis of the shroud, thereby providing an annular flange to mount the shroud. The second region 404 may be a transition region arranged between the first region 402 and the third region 406. The third region 406 may be a containment region configured to surround a turbine disc. The third region 406 is proximal to the blade 226 of the turbine disc. The third region 406 may be positioned radially outwards from the turbine disc such that debris flying radially outwards from the turbine will hit the shroud.

Similar to shroud 300, the first region 402, second region 404, and third region 406 may be comprised of an integral piece of material or may be comprised of more than one piece of material. Alternatively or additionally, the shroud 400 may be a single-layered shroud, a multiple-layered shroud, or may have another suitable arrangement.

The shroud 400 has a total length 408 from the beginning of the first region to the end of the shroud, which in this embodiment extends beyond the third region due to an exhaust diffuser 420 that facilitates stream lining of the exhaust flow to increase the turbine performance. In one embodiment, shroud 400 may have a total length 408 in the range of 17.5-20.5 cm. In one example, shroud 400 may have a length of 18.3 cm. However, other suitable lengths are also within the scope of this disclosure, such as 12.5-25 cm.

The second region 404 of the shroud 400 has a thickness 410, which may be optimized (or otherwise configured) to bear the load placed on the shroud. In one example, the thickness 410 may range from 3.5-4.1 cm. In another example, the thickness may range from 2.5-5 cm or other suitable ranges. Similar to shroud 300, shroud 400 may include a vertical thickness 412, or containment thickness 412, optimized (or otherwise configured) to withstand the impact of a high-energy turbine disc fragment release during a burst condition. The containment thickness 412 may be in the range of 2.5-5 cm in one example. In another non-limiting example, the containment thickness may be in the range of 3.8-4.3 cm or another suitable range. The containment thickness 412 traverses a containment zone 416 of the third region 406 arranged directly around the turbine blades 226. The containment zone 416 may have a horizontal length of in the range of 2.5-5 cm. In one example, the horizontal (axial) length of the containment zone may be another suitable length, such as, but not limited to, 4.1 cm or 4.3 cm.

As explained above with respect to FIG. 3, the selected thickness 410 of the second region may be dependent on a length 414 between the first region 402 and the third region 406. For example, as the length 414 between the first region 402 and the third region increases 406, the selected thickness 410 of the second region may decrease. As explained with respect to FIG. 3, the length 414 between the first region and the third region may include the length between the beginning of the first region and the beginning of the containment thickness zone of the third region, and may, for example, be in the range of 5-10 cm or another suitable range. In one non-limiting example, the length may be 7.4 cm. In the embodiment depicted in FIG. 4, the length 414 between the first region and the third region is less than half of a total length 408 of the shroud 400. In contrast, the length 314 of the embodiment of shroud 300 depicted in FIG. 3 is greater than half the total length 308 of the shroud 300. Because the selected thickness of the second region is dependent on the length between the first and third regions, the thickness 410 of the second region may be relatively thicker than the thickness 310 of the second region of shroud 300. For example, the containment thickness 412 may be at least as thick as the thickness 410 of the second region. In the depicted embodiment, the containment thickness 412 of the third region is substantially equal to the thickness 410 of the second region.

Shroud 400 also includes a clearance region 418 between the shroud 400 and the blades 226 to improve performance of the turbine disc and help direct the exhaust in a flow path. The clearance region 418 may have a spacing between the shroud 400 and blades 226 in a suitable range, such as but not limited to 0.03-0.25 cm. In one non-limiting example, the spacing may be 0.09 cm. However, other spacings are within the scope of this disclosure.

The shroud 400 includes an exhaust diffuser 420. The exhaust diffuser 420 may be a bell-mouthed end portion of the shroud 400 that helps lower exhaust backpressure. Due to the inclusion of the exhaust diffuser, the length 414 may be shorter than the length 314 discussed above with respect to FIG. 3. Additionally, the second region 404 may be aligned on the same horizontal axis 422 of the third region 406. In one example, the second region 404 may be positioned at an incline of 0° (as defined by a long axis of the second region) with respect to the horizontal axis 422. However, other alignments are within the scope of this disclosure. The alignment of the second region 404 on the horizontal axis 422 of the third region 406, together with the length 414 and thickness 410, may provide the second region 404 with increased tolerance to withstand the load placed on the shroud.

The shroud 400 may be comprised of wrought stainless steel having high strength and/or toughness at elevated temperatures, relative to other materials, and similar to shroud 300 described above with respect to FIG. 3. In one example, shroud 400 may be comprised of NITRONIC 50®. However, other materials which provide suitable strength at high temperatures may also be used.

FIG. 5 shows the upper-half of a radial cross-sectional view of an annular shroud 500 according to an embodiment of the present disclosure. Shroud 500 may be housed in a turbine, such as turbine 202 of FIG. 2; shroud 500 is one non-limiting example of shroud 230 of FIG. 2. Shroud 500 may be housed in a low pressure turbocharger in one non-limiting example. The low pressure turbocharger may be arranged downstream of a high pressure turbocharger, or may otherwise receive exhaust gas having a low pressure. As explained above, the terms "high pressure" and "low pressure" are relative, meaning that "high" pressure is a pressure higher than a "low" pressure. Conversely, a "low" pressure is a pressure lower than a "high" pressure. Alternatively, shroud 500 may be housed in another suitable turbocharger.

Similar to shrouds 300 and 400 described above with respect to FIGS. 3 and 4, shroud 500 includes a first region 502, a second region 504, and a third region 506. The first region may be a mounting region located distal to a turbine disc, the second region may be a transition region positioned between the third and first regions, and the third region may be a containment region proximal to the turbine disc. A long axis of the first region 502 may be generally perpendicular to the longitudinal axis of the shroud, thereby providing an annular flange to mount the shroud. The containment region may have an optimized containment thickness 512 and toughness to contain released turbine disc fragments during a burst condition, and may surround the turbine disc.

Similar to shrouds 300 and 400, the first region 502, second region 504, and third region 506 may be comprised of an integral piece of material. However, the shroud 500 may also be comprised of more than one piece of material. Alternatively or additionally, it may be a single-layered shroud or it may be a multiple-layered shroud, or another suitable arrangement.

The shroud 500 has a total length 508 from the beginning of the first region to the end of the third region. In one embodiment, shroud 500 may have a length 508 in the range of 15-20 cm. In another non-limiting example, the shroud may have a length of 18.3 cm. However, other suitable lengths are also within the scope of this disclosure, for example 12.5-25 cm.

The second region may have a thickness 510, for example in the range of 0.25-2.5 cm. In one example, the thickness may be 1 cm. In another example, it may range from 0.8-1.2 cm or be another suitable thickness. The containment thickness 512 may be in the range of 2.9-3.9 cm, or other suitable thickness, for example in the range of 2.5-5 cm. The containment thickness 512 may include a containment zone 515 arranged directly around the turbine blades 226. The containment zone 515 may have a horizontal (axial) length of a suitable length, for example in the range of 2.5-5 cm. In another example, the containment zone may be 4.4 cm, or it may be 4.6 cm. Other lengths are also possible.

Shroud 500 may have a length 514 between the first region and the third region, which in one example may be in the range of 2.5-25 cm. In another example, the length 514 between the first and third regions may be 9.9 cm. In the depicted embodiment, the length 514 between the first region and the third region is less than half of a total length 508 of the shroud 500, and the containment thickness 512 of the third region is greater than the thickness 510 of the second region. In the depicted embodiment, the containment thickness 512 of the third region (thickness extending radially outwards from blades 226) is at least twice as thick as the thickness 510 of the second region (radial thickness), and may be three times as thick, four times as thick, or another suitable thickness.

Similar to shroud 400 described with respect to FIG. 4, the second region 504 may be aligned on the same horizontal axis 516 of the third region 506. The alignment with the third region, together with the length 514 and thickness 510, may provide the second region 504 with increased tolerance to withstand the load placed on the shroud. Also similar to shrouds 300 and 400, a clearance region 518 is provided between the shroud 500 and the blades 226. The clearance region 518 may be a spacing between the shroud 500 and blades 226 of a suitable length, for example between 0.03-0.25 cm. In one example the clearance region 518 may be 0.09 cm.

The shroud 500 may be comprised of wrought stainless steel, or other material, having a high toughness and/or strength relative to other materials. In one example the shroud 500 may be comprised of NITRONIC 50®, similar to shroud 300 described above with respect to FIG. 3. However, other materials which provide suitable strength at high temperatures may also be used.

Figure 6:
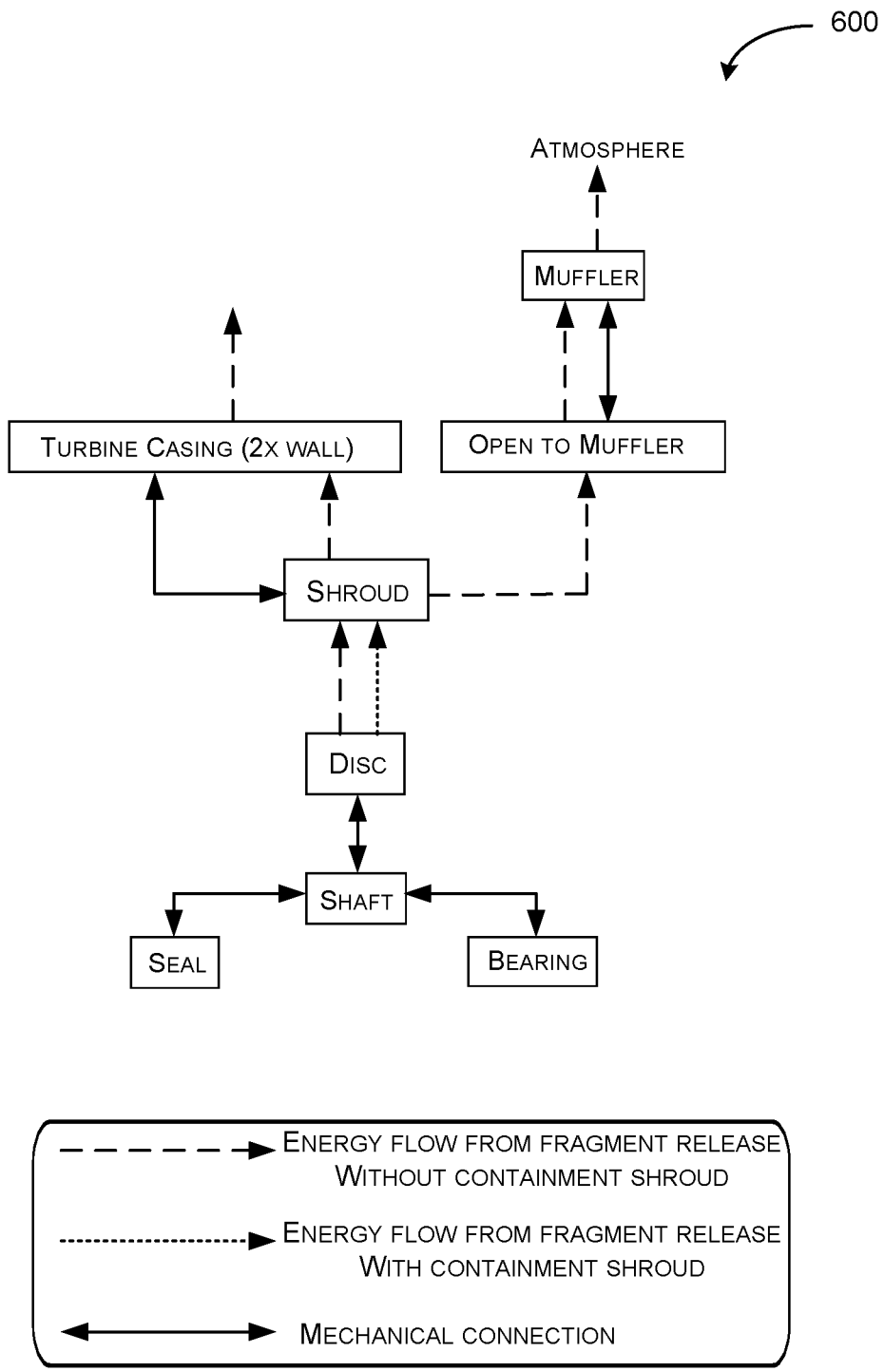
FIG. 6 is a diagram illustrating example energy flows during a high-energy disc fragment release according to an embodiment of the present invention.

FIG. 6 is a diagram illustrating energy flow during a burst condition including a high-energy disc fragment release in a turbine containment system 600. The solid arrows indicate a mechanical connection between the components of the containment system. As depicted, the turbine shaft is mechanically connected to at least one seal and bearing, and is connected to the turbine disc. The shroud is mechanically connected to the turbine casing, and opens out downstream to a muffler. FIG. 6 illustrates energy flow during a burst condition, with both a performance shroud of previous systems and a containment shroud according to an embodiment of the present disclosure.

Referring now to performance turbo shrouds of previous systems, the turbine in which the performance shroud is housed may undergo a burst condition in which one or more fragments of the turbine disc are released. These released disc fragments may have a high kinetic energy that, when a performance turbo shroud that is not optimized for containment is present, can puncture the turbine shroud surrounding the turbine disc. With the performance shrouds of previous systems, during the burst condition, the disc fragments may be released from the shroud by puncturing the shroud such that the fragments escape the shroud. This may cause damage to the turbine and/or other components near the turbine.

During a burst condition, when the turbine disc releases a fragment, energy from the fragment may flow through various components of the containment system. The dashed line arrows illustrate the energy flow of the containment system including a standard performance shroud (e.g., a non-containment shroud). The energy flows from the disc to the shroud, which may not be able to contain all the energy to retain the fragment in the shroud. As a result, the energy flows to the turbine casing, muffler, and out to the atmosphere and/or additional components not illustrated in FIG. 6.

Turning back to the containment shroud system of the present disclosure, the dotted line arrow of FIG. 6 indicates the energy flow during a burst condition where a high-energy disc fragment is released, in a turbine including a containment shroud, such as shroud 300, 400, or 500 of FIGS. 3-5. The energy flows from the disc fragments to the shroud. The containment shroud, unlike the non-containment shroud, includes increased burst strength by having a high modulus of toughness and/or increased thickness in at least the region surrounding the turbine disc. Because the shroud is configured to contain the disc fragments and has a higher puncture tolerance and tensile strength than a non-containment shroud, the energy from the fragment is contained within the disc-shroud complex and is not released to any other components of the containment system, turbocharger, or engine system.

Figure 7A:
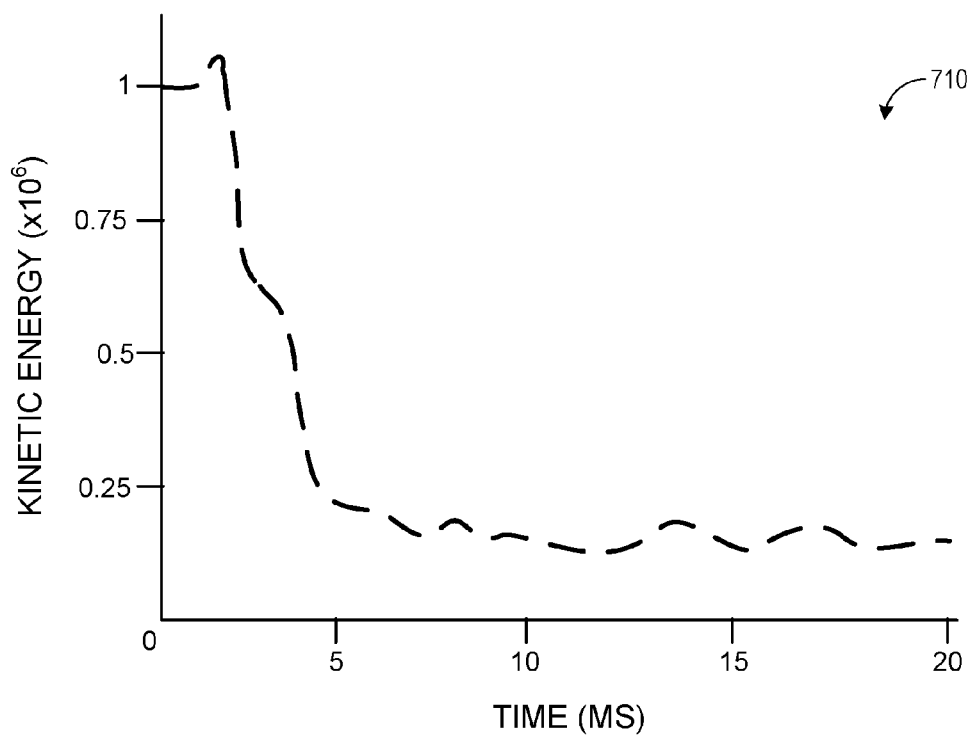
FIGS. 7A and 7B are diagrams illustrating kinetic energy during a burst condition.
Figure 7B:
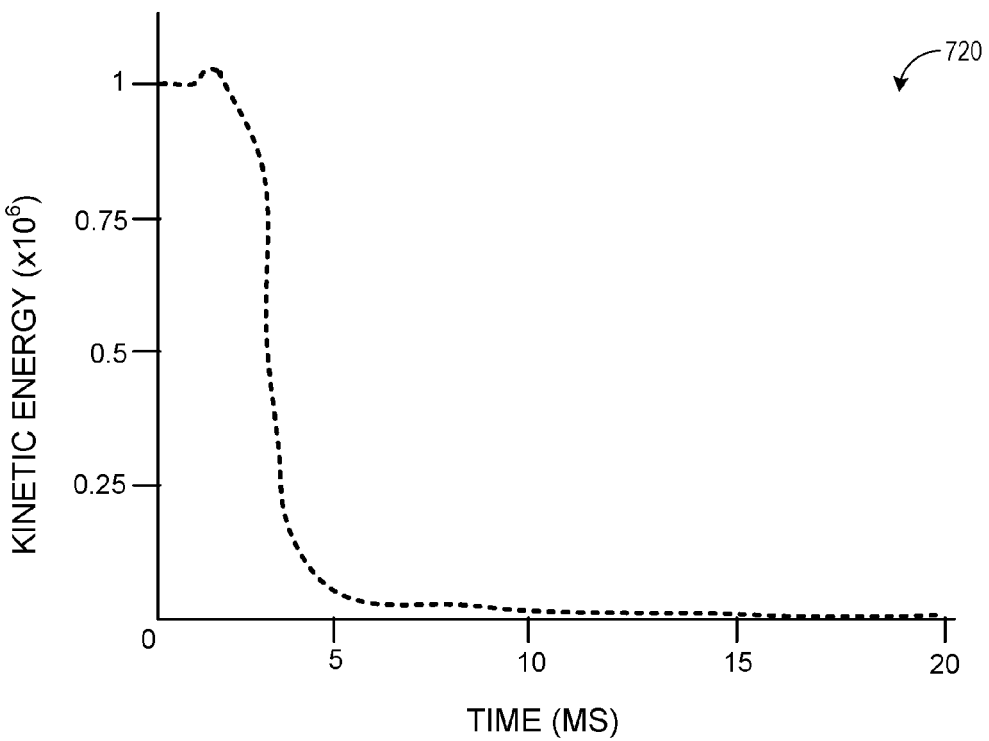

FIGS. 7A and 7B show a graph 710 and a graph 720, respectively, illustrating kinetic energy of a turbine disc fragment during a burst condition in which the high energy turbine disc fragment is released. Graph 710 of FIG. 7A illustrates the kinetic energy of the fragment release in a non-containment turbine shroud. Graph 720 of FIG. 7B illustrates the kinetic energy of the fragment release in a containment shroud according to one or more embodiments of the present disclosure, such as shroud 300, 400, and/or 500 of FIGS. 3-5.

For both graphs 710 and 720, the kinetic energy is depicted along the y-axis and time is depicted along the x-axis. The kinetic energy is the movement energy of the disc fragment, and is a function of the speed, material properties, and/or weight of the disc fragment. Graphs 710 and 720 depict the kinetic energy in lb-inch.

Referring to graph 710, the kinetic energy of the disc release is depicted on the dashed line. The disc release starts with a kinetic energy of around $1\times10^6$ lb-inch, and is initially lowered due to interaction with the shroud, as the kinetic energy drops to around $0.3\times10^6$ lb-inch. However, the non-containment shroud is not able to fully contain the energy of the disc fragment, as it remains at $0.3\times10^6$ lb-inch. As a result, the disc fragment maintains sufficient energy to puncture the shroud and transfer the energy to other components of the turbine and/or engine.

In contrast, graph 720 depicts the energy during a disc release in a turbine including a containment shroud (e.g., shrouds 300, 400, 500). The kinetic energy of the disc fragment is depicted on the dotted line. Similar to graph 710, the energy release of graph 720 starts around $1\times10^6$ lb-inch (around 1350 kilojoules (kJ)) However, in contrast to graph 710, the kinetic energy of the disc fragment drops substantially to zero, within 10 ms, and remains at zero. Thus, the burst strength of the containment shroud is sufficient to retain the disc fragment within the shroud, and the disc fragment does not have sufficient energy to puncture and exit the shroud. In an embodiment of the present disclosure, the shroud 300, 400, 500 is configured to contain disc fragments having a kinetic energy of at least 1350 kJ.

Figure 8:
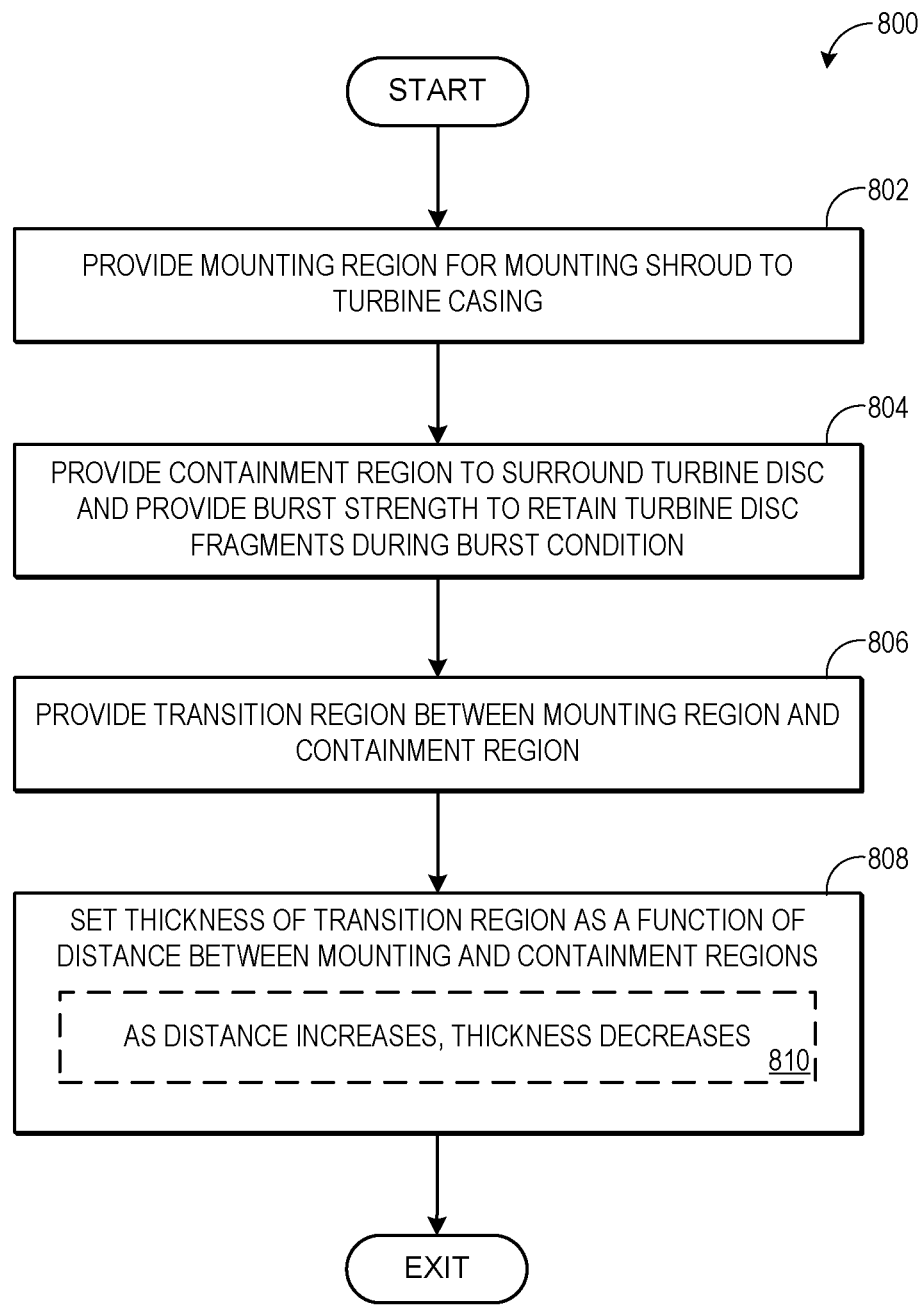
FIG. 8 is a flow chart illustrating a method for producing a shroud according to an embodiment of the present invention.

FIG. 8 is a flow chart illustrating a method 800 for producing a turbine shroud, such as shroud 300, 400, and/or 500 of FIGS. 3-5. Method 800 includes, at 802, providing a mounting region configured to mount the shroud to a casing of the turbine. As explained previously, the mounting region may include the first region of the shroud, and may be distal to the turbine disc when installed in a turbine. The mounting region may include a flange that may be coupled to the turbine casing when the shroud is installed in the turbine.

At 804, method 800 includes providing a containment region configured to surround the turbine disc. The containment region may include the third region of the shroud, and may be proximal to the turbine disc when installed in a turbine. Providing the containment region includes the containment region having a burst strength to retain one or more turbine disc fragments in the shroud during a burst condition. As explained previously, a burst condition may include a condition where one or more disc fragments are released at a high energy. This may include a foreign object entering the turbine, or a mechanical issue that causes the turbine disc to rupture or otherwise release from its coupling to the turbine. Any condition which results in a release of a high-energy turbine disc fragment may be considered a burst condition. The burst strength of the containment region may be a function of a thickness and/or toughness of the shroud within the containment region, to contain the disc fragments during a burst condition. The burst strength may allow the shroud to contain the kinetic energy of the disc fragments. For example, the burst strength of the containment region may reduce the kinetic energy of disc fragment during a burst condition to substantially zero, or another suitable kinetic energy, to retain the disc fragment within the shroud.

At 806, method 800 includes providing a transition region between the mounting region and the containment region. As explained previously, the transition region may be optimized to bear the impact load placed on the shroud. Depending on the turbine in which the shroud is housed, the thickness and/or length of the transition region may vary. As such, at 808, method 800 includes setting a thickness of the transition region as a function of a distance between the mounting region and the containment region. In some embodiments, this may include increasing the thickness of the transition region as the distance between the mounting region and containment region decreases at 810. For example, the distance between the mounting region and the containment region in shroud 300, described with respect to FIG. 3, may be longer than the distance between the mounting and containment region of shroud 400, described with respect to FIG. 4. As a result, the thickness of the transition region of shroud 400 may be thicker than the thickness of the transition region of shroud 300.

In an embodiment of an axial turbine herein having a shroud housing a turbine disc/blisk, the shroud including a first region, a second region, and a third region, a length between the first region and the third region is less than half of a total length of the shroud, and a thickness of the second region is essentially equal (no more than 1% difference) to a containment thickness of the third region.

Another embodiment relates to an axial turbine system for use in an engine system. The axial turbine system includes a turbine element, which is a member whose function is to move a shaft (connected to the turbine element) upon action of an exhaust stream. (For example, an end of the shaft distal from the turbine element may be connected to a compressor wheel.) The axial turbine system additionally includes a shroud housing the turbine element. The shroud comprises a mounting region distal to the turbine element, a containment region, and a transition region between the mounting region and the containment region. The containment region has a containment thickness proximal to the turbine disc; the containment thickness is at least as thick as a thickness of the transition region. In another embodiment, the containment thickness is essentially equal (equal within 1% or less) to the thickness of the transition region.

Another embodiment relates to a shroud for a turbine of an engine turbocharger. The shroud comprises an annular body having a longitudinal (center) axis. The annular body comprises, in radial cross-section, a first region having a long axis generally perpendicular to the longitudinal axis, a third region, and a second region disposed between and interconnecting the first region and the third region. The third region has a long axis parallel to the longitudinal axis. A maximum radial thickness of the third region is at least as thick as a maximum radial thickness of the second region.

In another embodiment of the shroud, the maximum radial thickness of the third region is at least twice as thick as the maximum radial thickness of the second region.

In another embodiment of the shroud, a long axis of the second region is disposed at a non-zero degree angle with respect to the longitudinal axis.

In another embodiment of the shroud, the first, second, and third regions are integral and comprised of metal.

In another embodiment of the shroud, the third region is configured to contain fragments of a turbine disc/blisk that are released when the turbine disc/blisk is rotating at 75% of a maximum RPM (e.g., 75% of its maximum rated RPM) of an engine turbocharger in which the shroud is installed with the third region radially outwardly surrounding the turbine disc/blisk.

In another embodiment of the shroud, the third region is configured to contain fragments of a turbine disc/blisk of an engine turbocharger that are released at a kinetic energy of 1350 kJ.

In another embodiment, an axial distance between the first region and the third region (e.g., as defined by the distance between the perpendicular first region and the increased thickness of the third region relative to the second region) is less than half of a total axial length of the shroud.

Another embodiment relates to an engine turbocharger. The engine turbocharger comprises a support frame/casing, and a turbine disc/blisk attached to a shaft, wherein the turbine disc/blisk and shaft are rotatably coupled to the support frame. The turbocharger additionally comprises a shroud. The shroud comprises an annular body having a longitudinal (center) axis. The annular body comprises, in radial cross-section, a first region having a long axis generally perpendicular to the longitudinal axis, a third region, and a second region disposed between and interconnecting the first region and the third region. The third region has a long axis parallel to the longitudinal axis. A maximum radial thickness of the third region is at least as thick as a maximum radial thickness of the second region. The shroud is attached to the support frame by way of the first region, and the third region annularly surrounds the turbine disc/blisk radially outwards from the turbine disc/blisk.

Another embodiment relates to a shroud for a turbine of an engine turbocharger. The shroud comprises an annular mounting flange. The shroud further comprises a cylindrical transition member attached to and coaxial with the flange and extending longitudinally outwards therefrom, e.g., the transition member may be perpendicular to the flange or inclined at an angle less than 90 degrees (for example, 60-90 degrees) with respect to the flange. The shroud further comprises a cylindrical containment member attached to and coaxial with the transition member, on an end of the transition member other than the end connected to the flange. That is, the transition member has a first end and a second end, with the flange being connected to the first end and the containment member connected to the second end. A maximum radial thickness of the containment member is at least as thick as a maximum radial thickness of the transition member. In another embodiment, the maximum radial thickness of the containment member is greater than the maximum radial thickness of the transition member. In another embodiment, the maximum radial thickness of the containment member is at least twice as thick as the maximum radial thickness of the transition member. When installed in a turbocharger, the annular mounting flange is used to connect the shroud to a support/frame of the turbocharger, and the containment member is positioned to annularly radially outwardly surround a turbine disc/blisk of the turbocharger. The containment member is configured to contain fragments of the disc/blisk that are released during a burst condition, e.g., at least fragments having a kinetic energy of 1350 kJ, and/or at least fragments released when the turbocharger is operating at 75% of its maximum RPM (e.g., 75% of its maximum rated RPM).

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An axial turbine for use in an engine system, comprising:
    a turbine element configured to move a shaft upon action of an exhaust stream; and
    a shroud housing the turbine element, the shroud comprising:
        a mounting region distal to the turbine element,
        a containment region,
        a transition region between the mounting region and the containment region, the containment region having a containment thickness proximal to the turbine element, the containment thickness at least as thick as a thickness of the transition region, and
        a bell-mouthed exhaust diffuser coupled to the containment region, where a thickness of the shroud decreases in a direction from the containment region to an end of the exhaust diffuser, the shroud further comprising an outer surface that includes an upper flat segment within the containment region and further includes curvature within the exhaust diffuser, an end of the exhaust diffuser level with the upper flat segment.

2. The axial turbine of claim 1, wherein the containment thickness is substantially equal to the thickness of the transition region, and wherein the shroud comprises an inner surface opposite the outer surface that includes a lower flat segment within the containment region and further inclines from the lower flat segment in a direction towards the end of the exhaust diffuser.

3. The axial turbine of claim 1, wherein the transition region is aligned on a longitudinal axis with the containment region.

4. The axial turbine of claim 1, wherein the shroud is comprised of wrought stainless steel having a modulus of toughness greater than 14,000 psi at 500° C.

5. The axial turbine of claim 1, wherein the containment region has a burst strength that under a burst condition retains one or more fragments of the turbine element, and wherein the burst condition comprises release of the fragments from the turbine element when the turbine element is operating at least 75% of a maximum RPM of the axial turbine.

6. A locomotive, comprising:
    an engine including an exhaust system; and
    the axial turbine of claim 1 positioned within the exhaust system.

* * * * *